(12) United States Patent
Shi et al.

(10) Patent No.: US 11,425,759 B2
(45) Date of Patent: Aug. 23, 2022

(54) METHOD FOR LINK RECONFIGURATION AND TERMINAL DEVICE

(71) Applicant: GUANGDONG OPPO MOBILE TELECOMMUNICATIONS CORP., LTD., Guangdong (CN)

(72) Inventors: Zhihua Shi, Guangdong (CN); Wenhong Chen, Guangdong (CN); Zhi Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 17 days.

(21) Appl. No.: 16/944,100

(22) Filed: Jul. 30, 2020

(65) Prior Publication Data
US 2020/0359424 A1 Nov. 12, 2020

Related U.S. Application Data

(63) Continuation of application No. PCT/CN2018/075673, filed on Feb. 7, 2018.

(51) Int. Cl.
*H04W 74/02* (2009.01)
*H04W 74/08* (2009.01)
(Continued)

(52) U.S. Cl.
CPC ...... *H04W 74/0833* (2013.01); *H04B 7/0626* (2013.01); *H04B 7/0695* (2013.01);
(Continued)

(58) Field of Classification Search
CPC ..... H04W 72/04; H04W 88/08; H04W 76/00; H04W 74/0833; H04W 56/001;
(Continued)

(56) References Cited

U.S. PATENT DOCUMENTS 7,898,948 B2 3/2011 Digirolamo
8,824,310 B2 9/2014 Jeong
(Continued)

FOREIGN PATENT DOCUMENTS

CN 101932044 A 12/2010
CN 101946424 A 1/2011
(Continued)

OTHER PUBLICATIONS

First Office Action of the Chinese application No. 202010479531.9, dated May 20, 2021.
(Continued)

*Primary Examiner* — Hassan A Phillips
*Assistant Examiner* — Prenell P Jones
(74) *Attorney, Agent, or Firm* — Perkins Coie LLP

(57) ABSTRACT

A method for link reconfiguration includes that: the terminal device selects a target signal from a second signal set when a beam failure occurs, where the beam failure includes that quality of a signal in a first signal set satisfies a first condition, the first condition includes that the quality of the signal is worse than a threshold, and quality of the target signal is good enough to satisfy a second condition; the terminal device determines a physical random access channel (PRACH) sequence the resource corresponding to the target signal according to associations between signals in the second signal set and PRACH sequences and resources; and the terminal device sends a first request to a network device through the PRACH sequence and resource corresponding to the target signal, where the first request is used to notify the network device of information about the target signal selected by the terminal device.

18 Claims, 4 Drawing Sheets

(51) Int. Cl.
  *H04B 7/06* (2006.01)
  *H04L 5/00* (2006.01)
  *H04W 56/00* (2009.01)
  *H04W 72/00* (2009.01)

(52) U.S. Cl.
  CPC ......... *H04L 5/0051* (2013.01); *H04W 56/001* (2013.01); *H04W 72/005* (2013.01); *H04W 74/02* (2013.01)

(58) Field of Classification Search
  CPC .. H04W 72/005; H04W 74/02; H04B 7/0626; H04B 7/0695; H04L 5/0051
  See application file for complete search history.

(56) References Cited

U.S. PATENT DOCUMENTS

| | | | |
|---|---|---|---|
| 8,837,438 B2 | 9/2014 | Park | |
| 8,971,349 B2 | 3/2015 | Park et al. | |
| 9,210,677 B2 | 12/2015 | Jang | |
| 9,338,800 B2 | 5/2016 | Park et al. | |
| 9,380,632 B2 | 6/2016 | Jeong et al. | |
| 9,398,632 B2 | 7/2016 | Jeong et al. | |
| 9,838,901 B2 | 12/2017 | Lee et al. | |
| 9,844,078 B2 | 12/2017 | Park et al. | |
| 10,264,618 B2 | 4/2019 | Jeong et al. | |
| 10,582,480 B2 | 3/2020 | Jang | |
| 10,868,772 B2 | 12/2020 | Zhang | |
| 2008/0095185 A1 | 4/2008 | Digirolamo | |
| 2009/0213818 A1 | 8/2009 | Park | |
| 2012/0257510 A1 | 10/2012 | Jeong | |
| 2012/0257570 A1 | 10/2012 | Jang | |
| 2012/0300715 A1 | 11/2012 | Pelletier et al. | |
| 2013/0201949 A1 | 8/2013 | Park et al. | |
| 2014/0016559 A1 | 1/2014 | Jang | |
| 2014/0341011 A1 | 11/2014 | Jeong et al. | |
| 2015/0131633 A1 | 5/2015 | Park et al. | |
| 2015/0134837 A1 | 5/2015 | Jeong et al. | |
| 2015/0134838 A1 | 5/2015 | Jeong et al. | |
| 2016/0094975 A1 | 3/2016 | Sheng | |
| 2016/0100360 A1 | 4/2016 | Liu et al. | |
| 2016/0234866 A1 | 8/2016 | Park et al. | |
| 2016/0242064 A1 | 8/2016 | Lee et al. | |
| 2017/0367114 A1 | 12/2017 | Ahn et al. | |
| 2018/0041949 A1* | 2/2018 | Liu | H04W 48/16 |
| 2018/0070259 A1 | 3/2018 | Lee et al. | |
| 2018/0219604 A1 | 8/2018 | Lu et al. | |
| 2019/0081675 A1* | 3/2019 | Jung | H04W 56/001 |
| 2019/0081753 A1* | 3/2019 | Jung | H04L 1/1854 |
| 2019/0173740 A1 | 6/2019 | Zhang et al. | |
| 2019/0230545 A1* | 7/2019 | Liou | H04W 24/10 |
| 2019/0372830 A1 | 12/2019 | Zhang et al. | |
| 2020/0036427 A1 | 1/2020 | Zhang et al. | |
| 2020/0045745 A1 | 2/2020 | Cirik et al. | |
| 2020/0068457 A1 | 2/2020 | You et al. | |
| 2020/0083946 A1 | 3/2020 | You et al. | |
| 2020/0100154 A1 | 3/2020 | Cirik et al. | |
| 2020/0137821 A1 | 4/2020 | Cirik et al. | |
| 2020/0145280 A1 | 5/2020 | Cirik et al. | |
| 2020/0186218 A1 | 6/2020 | Wu et al. | |
| 2020/0205139 A1 | 6/2020 | Jang et al. | |
| 2020/0288479 A1 | 9/2020 | Xi et al. | |
| 2020/0305216 A1 | 9/2020 | Kim | |
| 2020/0314721 A1* | 10/2020 | Cheng | H04W 36/0016 |
| 2020/0322035 A1 | 10/2020 | Shi et al. | |
| 2020/0328796 A1 | 10/2020 | Turtinen et al. | |
| 2020/0350973 A1 | 11/2020 | Cirik | |
| 2020/0351860 A1 | 11/2020 | Chen | |
| 2020/0358574 A1* | 11/2020 | Jung | H04L 5/0048 |
| 2020/0373992 A1 | 11/2020 | Wang et al. | |
| 2020/0389840 A1* | 12/2020 | Liu | H04W 48/16 |
| 2020/0403682 A1 | 12/2020 | Koskela et al. | |
| 2020/0413395 A1 | 12/2020 | Chen et al. | |
| 2021/0029739 A1* | 1/2021 | Shi | H04W 24/10 |
| 2021/0076452 A1* | 3/2021 | Islam | H04L 69/324 |
| 2021/0092632 A1* | 3/2021 | Liou | H04W 76/19 |
| 2021/0136823 A1* | 5/2021 | Kim | H04W 56/00 |

FOREIGN PATENT DOCUMENTS

| | | |
|---|---|---|
| CN | 101946424 B | 8/2013 |
| CN | 103260250 A | 8/2013 |
| CN | 105828394 A | 8/2016 |
| CN | 106664700 A | 5/2017 |
| CN | 107079459 A | 8/2017 |
| CN | 107342801 A | 11/2017 |
| CN | 107567038 A | 1/2018 |
| CN | 107612602 A | 1/2018 |
| EP | 2094054 A2 | 8/2009 |
| EP | 2094054 A3 | 11/2013 |
| EP | 2094054 B1 | 11/2017 |
| JP | 5129863 B2 | 1/2013 |
| KR | 20100089876 A | 8/2010 |
| KR | 101151143 B1 | 6/2012 |
| RU | 2608950 C1 | 1/2017 |
| WO | 2009107947 A1 | 9/2009 |
| WO | 2016048870 A1 | 3/2016 |
| WO | 2017024516 A1 | 2/2017 |
| WO | 2017026455 A1 | 2/2017 |
| WO | 2017123060 A1 | 7/2017 |
| WO | 2017151876 A1 | 9/2017 |
| WO | 2017180334 A1 | 10/2017 |
| WO | 2018017840 A1 | 1/2018 |

OTHER PUBLICATIONS

First Office Action of the European application No. 18904531.3, dated Jun. 8, 2021.
Mediatek Inc: "Further Clarification on Beam Failure Recovery Procedure", 3GPP Draft;R2-1800652, 3rd Generation Partnership Project (3GPP), Mobile Competence Centre; 650,Route Des Lucioles; F-06921 Sophia-Antipoli, vo1.RAN WG2, No. Vancouver,Canada;Jan. 22, 2018-Jan. 26, 2018,Jan. 12, 2018 (Jan. 12, 2018), XP051386275.
Written Opinion of the International Search Authority in the international application No. PCT/CN2018/075673, dated Nov. 5, 2018.
LG Electronics, Discussion on beam failure recovery, Discussion and Decision, 3GPP TSG RAN WG1 Meeting #91 R1-1719908, Nov. 27-Dec. 1, 2017.
Ericsson, Remaining details of beam recovery, Discussion and Decision, 3GPP TSG-RAN WG1 #91 R1-1720737, Nov. 27-Dec. 1, 2017.
Mediatek Inc: "Design Details on Beam Failure Recovery", 3GPP Draft: R1 -1718334 Beamrecovery Final, 3rd Generation Partnership Project (3GPP), Mobile Competence Centre; 650, Route Des Lucioles: F-06921 Sophia-Anti Polis Cedex France vol. RAN WG1, No. Prague, Czechia; Oct. 9, 2017-201710133 Oct. 2017 (Oct. 3, 2017), XP051352959, Retrieved from the Internet: URL: http://www.3gpp.org/ftp/tsg_ran/WG1 RL1/TSGR1 90b/Docs/ [retrieved on Oct. 3, 2017] sections 2 to 4 *.
Zte et al: "Discussion on beam recovery", 3GPP Draft; R1 -1719534 Discussion on Beam Recovery, 3rd Generation Partnership Project (3GPP), Mobile Competence Centre; 650, Route Des Lucioles; F-06921 Sophia-Anti Polis Cedex; France vol. RAN WG1, No. Reno, USA; 201711272017120118 Nov. 2017 (Nov. 18, 2017), XP051369348, Retrieved from the Internet: URL: http://www.3gpp.org/ftp/tsg%5Fran/WG1%5FRL1/TSGR1%5F91/Docs/ [ retrieved on Nov. 18, 2017] *sections 2 to 3*.
Nokia et al: "Beam Recovery in NR", 3GPP Draft; R2-1700075 Beam Recovery, 3rd Generation Partnership Project (3GPP), Mobi Le Competence Centre ; 650, Route Des Lucioles: F-06921 Sophia-Antipolis Cedex; France vol. RAN WG2, No. Spokane, USA; 201701172017011917 Jan. 2017 (Jan. 17, 2017), XP051210662, Retrieved from the Internet: URL: http://www.3gpp.org/ftp/Meetings_3GPP SYNC/RAN2/Docs/ [ retrieved on Jan. 17, 2017] *sections 2 to 2.2.2 *.
Samsung: "Motivation and Considerations of Beam Recovery", 3GPP Draft; R2-167945 Motivation Andconsiderations of Beam Recovery, 3rd Generation Partnership Project (3GPP), Mobile Com-

(56) References Cited

OTHER PUBLICATIONS petence Centre ; 650, Route Des Lucioles: F-06921 Sophia-Antipolis Cedex; F, vol. RAN WG2, No. Reno, USA; 201611142016111813 Nov. 2016 (Nov. 13, 2016), XP051177675, Retrieved from the Internet: URL: http://www.3gpp.org/ftp/Meetings_3GPP SYNC/RAN2/Docs/ [ retrieved on Nov. 13, 2016] *section 2.3 *.
Supplementary European Search Report in the European application No. 18904531.3, dated Oct. 30, 2020.
3rd Generation Partnership Project. "3rd Generation Partnership Project; Technical Specification Group Radio Access Network; NR; Medium Access Control (MAC) Protocol Specification(Release 15)" 3GPP TS 38.321 V2.0.0 (Dec. 2017),Dec. 11, 2017 (Dec. 11, 2017). sections 5.1 and 5.17.
TSG RAN WG1. "Status Report to TSG" 3GPP TSG RAN meeting #78 RP-172461, Dec. 12, 2017(Dec. 12, 2017) entire document.
International Search Report in the international application No. PCT/CN2018/075673, dated Nov. 5, 2018.
Ericsson, Remaining details and corrections for beam recovery, 3GPP TSG RAN WG1 adhoc_NR_AH_1801 R1-1800700_ Internet<URL: http://www.3gpp.org/ftp/tsg_ran/WG1_RL1/TSGR1_AH/NR_AH_1801/Docs/R1-1800700.zip>, Jan. 22, 2018, section 2. 8 pages.
First Office Action of the Japanese application No. 2019-566338, dated Dec. 21, 2021. 14 pages with English translation.
InterDigital, Inc., Remaining details on beam failure recovery, 3GPP TSG RAN WG1 adhoc_NR_AH_1801 R1-1800629, Internet<URL: http://ww.3gpp.org/ftp/tsg_ran/WG1_RL1/TSGR1_AH/NR_AH_1801/Docs/R1-1800629.zip>, Jan. 22, 2018, section 2. 2 pages.
Vivo, Discussion on beam failure recovery procedure, 3GPP TS G RAN WG1_adhoc_NR_AH_1709 R1-1715620, Internet<URL: http://www.3gpp.org.ftp/tsg_ran/WG1_RL1/TSGR1_AH/NR_AH_1709/Docs/R1-1715620.zip>, Sep. 18, 2017, section 2 and 4. 7 pages.
Second Office Action of the European application No. 18904531.3, dated Nov. 22, 2021. 9 pages.
Office Action of the Indian application No. 202017037065, dated Sep. 24, 2021. 7 pages with English translation.
Pre-Interview Communication of the U.S. Appl. No. 16/338,574, dated Jan. 14, 2021. 12 pages.
Notice of Allowance of the U.S. Appl. No. 16/338,574, dated Mar. 17, 2021. 12 pages.
International Search Report in the international application No. PCT/CN2018/076863, dated Nov. 8, 2018. 6 pages with English translation.
Written Opinion of the International Search Authority in the international application No. PCT/CN2018/076863, dated Nov. 8, 2018. 6 pages with English translation.
Catt: "Summary on BFR detection and other BFR issues", 3GPP Draft; R2-1801558 Summary on BFR Detection and Other BFR Issues, 3rd Generation Partnership Project(3GPP), Mobile Competence Centre; 650, Route Des Lucioles; F-06921 Sophia-Antipolis Cedex; F, vol. RAN WG2, No. Vancouver, Canada; Jan. 22, 2018-Jan. 26, 2018 27, XP051387015. 11 pages.
"3rd Generation Partnership Project; Technical Specification Group Radio Access Network; NR; Medium Access Control (MAC) protocol specification (Release 15)", 3GPP Standard; Technical Specification; 3GPP TS 38.321, 3rd Generation Partnership Project (3GPP), Mobile Competence Centre; 650, Route Des Lucioles; F-06921 Sophia-Antipolis Cedex; France, vol. Ran WG2, No. V15.0.0, Jan. 4, 2018, pp. 1-55, XP051392362. 56 pages.

"3rd Generation Partnership Project; Technical Specification Group Radio Access Network; NR; Physical layer procedures for control (Release 15)", 3GPP Standrad; Technical Specification; 3GPP TS 38.213, 3rd Generation Partnership Project (3GPP), Mobile Competence Centre; 650, Route Des Lucioles; F-06921 Sophia-Antipolis Cedex; France, vol. RAN WG1, No. V15.0.0, Jan. 3, 2018, pp. 1-56, XP051392263. 56 pages.
Samsung: "NR beam recovery procedure". 3GPP Draft; R2-1709587 NR Beam Recovery Procedure, 3rd Generation Partnerdhip Project (3GPP), Mobile Competence Centre; 650, Route Des Lucioles; F-06921 Sophia-Antipolis Cedex; France, vol. RAN WG2, No. Berlin, Germany; Aug. 21, 2017-Aug. 25, 2017, XP051319302. 5 pages.
Nokia et al: "Impact of Beam Failure Recovery on RLF related actions", 3GPP Draft; R2-1802071_Impact of Beam Failure Recovery on RLF Related Actions, 3rd Generation Partnership Project (3GPP), Mobile Competence Centre; 650, Route Des Lucioles; F-06921 Sophia-Antipolis, vol. RAN WG2, No. Athens, Greece; Feb. 26, 2018-Mar. 2, 2018, XP051398982. 4 pages.
Supplementary European Search Report in the European application No. 18852789.9, dated Aug. 21, 2019. 13 pages.
First Office Action of the European application No. 18852789.9, dated May 20, 2020. 7 pages.
3GPP TSG-RAN WG2 NR Ad hoc 0118 R2-1800254, Vancouver, Canada, Jan. 22-Jan. 26, 2018, Source: CATT, Title: RA Procedure and Parameters for BFR, Agenda Item: 10.3.1.4.2, Document for: Discussion and Decision. 5 pages.
Supplementary European Search Report in the European application No. 21172979.3, dated Aug. 26, 2021. 16 pages.
First Office Action of the Chinese application No. 201880005411.6, dated Apr. 13, 2020. 17 pages with English translation.
Second Office Action of the Chinese application No. 201880005411.6, dated Jul. 16, 2020. 7 pages with English translation.
MediaTek [RAN1], "LS to RAN2 on Beam Failure Recovery", 3GPP TSG RAN WG1 Meeting #91 R1-1721700, Reno, USA, Nov. 27-Dec. 1, 2017. 2 pages.
Office Action of the Indian application No. 201917042820, dated Jan. 6, 2021. 6 pages with English translation.
First Office Action of the Indonesian application No. P00202006599, dated Dec. 1, 2021. 8 pages with English translation.
First Office Action of the Canadian application No. 3066671, dated Feb. 8, 2021. 5 pages.
First Office Action of the Russian application No. 2020100940, dated Jun. 8, 2021. 10 pages with English translation.
First Office Action of the Chilean application No. 201903872, dated Feb. 18, 2021. 32 pages with English translation.
Second Office Action of the Chilean application No. 201903872, dated Oct. 26, 2021. 40 pages with English translation.
First Office Action of the Japanese application No. 2020-542644, dated Dec. 17, 2021. 6 pages with English translation.
MediaTek Inc., Offline Summary for Remaing issues on Beam Failure Recovery, 3GPP TSG RAN WG1 adhoc_NR_AH_1801 R1-1801197, 3GPP, Jan. 29, 2018. 11 pages.
Zte, Discussion on mechanism to recovery from beam failure, 3GPP TSG RAN WG1 #90 R1-1712300, 3GPP, Aug. 12, 2017. 10 pages.
Third Office Action of the European application No. 18904531.3, dated May 9, 2022. 6 pages.
Written Opinion of the Singaporean application No. 11201911149X, dated May 12, 2022. 9 pages.
First Office Action of the Chinese application No. 202011380300.9, dated Jun. 13, 2022. 15 pages with English translation.

* cited by examiner

METHOD FOR LINK RECONFIGURATION AND TERMINAL DEVICE

CROSS-REFERENCE TO RELATED APPLICATION

This application is a U.S. continuation application of International Application No. PCT/CN 2018/075673, entitled "METHOD FOR LINK RECONFIGURATION AND TERMINAL DEVICE", filed on Feb. 7, 2018, the disclosure of which is hereby incorporated by reference in its entirety.

TECHNICAL FIELD

The disclosure relates to the field of communications, and more particularly to a method for link reconfiguration and a terminal device.

BACKGROUND

In researches on 5th-Generation (5G) mobile communication technologies, a beamforming technology is an important technology for improving coverage and spectrum efficiency. Beamforming refers to an antenna-array-based signal preprocessing technology and generates a directional beam by regulating a weight of a signal transmitted on each antenna array element.

A network device may transmit different signal sets using different beams. A terminal device may measure a received signal set to determine whether a link for transmission of the signal set is too bad to be available, namely determining whether the transmission beam for the signal set is available. That is, whether a beam failure occurs is determined. In case of a beam failure, the terminal device may select a signal with better quality from another signal set.

SUMMARY

In view of this, the embodiments of the disclosure provide a method for link reconfiguration and a terminal device.

A first aspect provides a method for link reconfiguration, which includes that: a terminal device selects a target signal from a second signal set when a beam failure occurs, the beam failure including that quality of a signal in a first signal set satisfies a first condition, the first condition including that the quality of the signal is worse than a threshold, and the quality of the target signal being good enough to satisfy a second condition; the terminal device determines a Physical Random Access Channel (PRACH) sequence and resource corresponding to the target signal according to associations between signals in the second signal set and PRACH sequences and resources; and the terminal device sends a first request to a network device through the PRACH sequence and the resource corresponding to the target signal, the first request being used to notify the network device of information about the target signal selected by the terminal device.

A second aspect provides a terminal device, which includes a memory, a processor, an input interface and an output interface. The memory, the processor, the input interface and the output interface are connected through a bus system. The memory is configured to store instructions. The processor is configured to execute the instructions stored in the memory to perform the method in the first aspect.

These aspects or other aspects of the disclosure will become clearer and easier to understand through the following descriptions about the embodiments.

DETAILED DESCRIPTION

Figure 1:
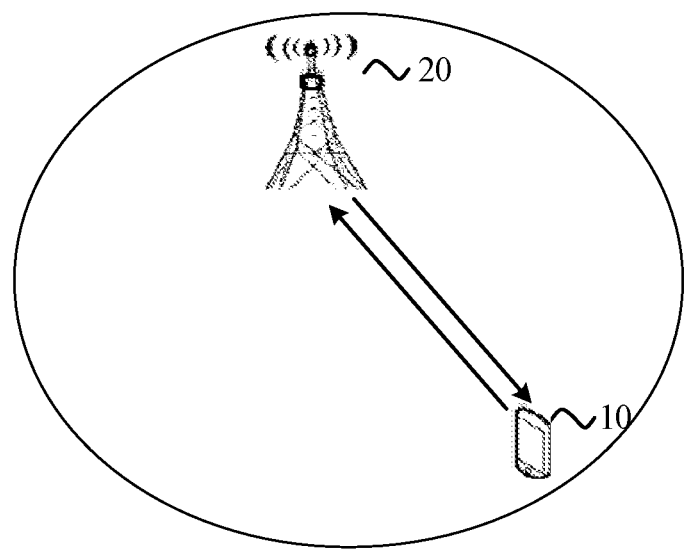
FIG. 1 is a schematic diagram of an application scenario according to an embodiment of the disclosure.

The technical solutions in the embodiments of the disclosure will be clearly and completely described below in combination with the drawings in the embodiments of the disclosure.

In the related art, a network device may transmit different signal sets using different beams. A terminal device may measure a received signal set to determine whether a link for transmission of the signal set is too poor to be available, namely determining whether the transmission beam for the signal set is available. That is, whether a beam failure occurs is determined. In case of a beam failure, the terminal device may select a signal with better quality from another signal set. How a terminal device reports a selected signal with better quality to a network device is a problem to be solved.

It is to be understood that the technical solutions of the embodiments of the disclosure may be applied to various communication systems, for example, a Global System of Mobile communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD) system, a Universal Mobile Telecommunication System (UMTS), a Worldwide Interoperability for Microwave Access (WiMAX) communication system, New Radio (NR) system or a future 5G system.

Particularly, the technical solutions of the embodiments of the disclosure may be applied to various non-orthogonal multiple access technology-based communication systems, for example, a Sparse Code Multiple Access (SCMA) system, a Low Density Signature (LDS) system and the like. Of course, the SCMA system and the LDS system may also have other names in the field of communications. Furthermore, the technical solutions of the embodiments of the disclosure may be applied to multi-carrier transmission systems adopting non-orthogonal multiple access technologies, for example, Orthogonal Frequency Division Multiplexing (OFDM), Filter Bank Multi-Carrier (FBMC), Generalized Frequency Division Multiplexing (GFDM) and Filtered-OFDM (F-OFDM) systems adopting the non-orthogonal multiple access technologies.

In the embodiments of the disclosure, a terminal device may refer to User Equipment (UE), an access terminal, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device or another processing device connected to a wireless modem, a vehicle-mounted device, a wearable device, UE in a future 5G network, UE in a future evolved Public Land Mobile Network (PLMN) or the like. There are no limits made in the embodiments of the disclosure.

In the embodiments of the disclosure, the network device may be a device used to communicate with the terminal device. The network device may be a Base Transceiver Station (BTS) in the GSM or the CDMA, may also be a NodeB (NB) in the WCDMA system, may also be an Evolutional Node B (eNB or eNodeB) in the LTE system and may further be a wireless controller in a Cloud Radio Access Network (CRAN) scenario. Or the network device may be a relay station, an access point, a vehicle device, a wearable device, a network device in the future 5G network, a network device in the future evolved PLMN or the like. There are no limits made in the embodiments of the disclosure.

FIG. 1 is a schematic diagram of an application scenario according to an embodiment of the disclosure. A communication system illustrated in FIG. 1 may include a terminal device 10 and a network device 20. The network device 20 is used to provide communication service for the terminal device 10 for access to a core network. The terminal device 10 accesses the network by searching for a Synchronization Signal (SS), a broadcast signal and the like sent by the network device 20, thereby communicating with the network. Arrows illustrated in FIG. 1 may represent uplink/downlink transmission implemented through a cellular link between the terminal device 10 and the network device 20.

Figure 2:
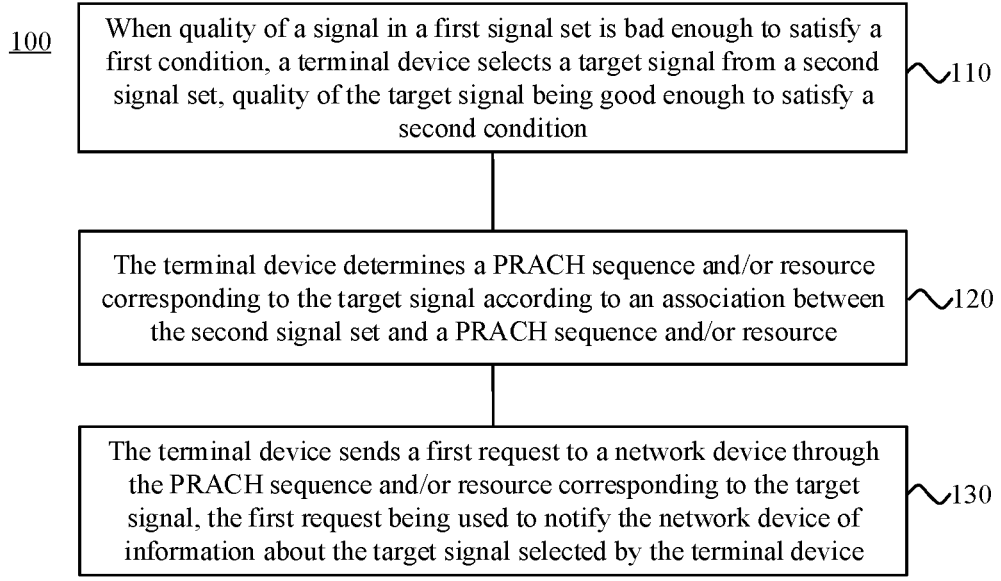
FIG. 2 is a schematic block diagram of a method for link reconfiguration according to an embodiment of the disclosure.

FIG. 2 is a schematic block diagram of a method for link reconfiguration 100 according to an embodiment of the disclosure. As illustrated in FIG. 2, the method 100 includes part or all of the following contents.

In S110, when quality of a signal in a first signal set is bad enough to satisfy a first condition, a terminal device selects a target signal from a second signal set, quality of the target signal being good enough to satisfy a second condition.

In S120, the terminal device determines a PRACH sequence and/or resource corresponding to the target signal according to associations between signals in the second signal set and PRACH sequences and resources.

In S130, the terminal device sends a first request to a network device through the PRACH sequence and/or resource corresponding to the target signal, the first request being used to notify the network device of information about the target signal selected by the terminal device.

Specifically, after the terminal device receives signals of a signal set sent by the network device, the terminal device may measure the signals in the signal set, thereby determining quality of a link for transmission of these signals. That is, whether a transmission beam for the signals in the signal set is available or not is determined. For example, whether quality of the signals in the signal set is lower than a threshold or not may be determined. When the quality of all the signals in the signal set is lower than the threshold during a measurement, it may be determined that the beam for the signal set is unavailable. When the terminal device determines that the transmission beam for the signal set is really unavailable, the terminal device may select a signal with better quality from another signal set and reports the selected signal to the network device such that the network device may use a transmission beam for the signal reported by the terminal device for subsequent signal transmission. The network device may configure an association between a signal and a PRACH sequence and/or resource in advance, and then the terminal device may determine the PRACH sequence and/or resource corresponding to the selected signal, so that the terminal device may send information about the signal selected by the terminal device to the network device through the selected PRACH sequence and/or resource. After the network device receives a request sent by the terminal device through the selected PRACH sequence and/or resource, the network device may determine the signal selected by the terminal device, so that the network device may send a subsequent signal to the terminal device by use of the transmission beam for the signal reported by the terminal device.

Therefore, the method for link reconfiguration according to the embodiment of the disclosure is favorable for improving signal transmission performance.

In at least one alternative embodiment, PRACH resources may usually be divided into contention-based PRACH resources and contention-free PRACH resources. For a terminal device, contention-based PRACH resources can be considered as a resource pool, and different terminal devices may use the same resource, thereby causing resource contention. A contention-free PRACH resource is specific to a terminal device, that is, it may be allocated exclusively to a terminal device by the network device at a moment.

In the embodiment of the disclosure, signals in the first signal set and the second signal set may include at least one of a CSI-RS or an SS/PBCH block.

In at least one alternative embodiment, the target signal selected by the terminal device from the second signal set may be only associated with a contention-based PRACH resource. In such case, the terminal device selects the contention-based PRACH resource corresponding to the target signal according to the association between the signal in the second signal set and the PRACH sequence and/or resource, so that the terminal device may send the first request to the network device through the selected contention-based PRACH resource.

In at least one alternative embodiment, the target signal selected by the terminal device from the second signal set may be only associated with a contention-free PRACH resource. In such case, the terminal device may select the contention-free PRACH resource corresponding to the target signal according to the association between the signal in the second signal set and the PRACH sequence and/or resource to send the first request to the network device.

In at least one alternative embodiment, the target signal selected by the terminal device from the second signal set may not only be associated with the contention-based PRACH resource but also be associated with the contention-free PRACH resource. In such case, the terminal device may send the first request to the network device in the following four manners.

First manner: The terminal device may send the first request to the network device only according to the contention-based PRACH resource associated with the target signal. For example, the terminal device sends the first request to the network device for the first time according to the contention-based PRACH resource associated with the target signal, and if the terminal device does not receive a response to the first request sent for the first time from the network device in a time window, the terminal device may send the first request to the network device for the second time according to the contention-based PRACH resource associated with the target signal until the number of times for which the terminal device sends the first request to the network device reaches a threshold.

Second manner: The terminal device may send the first request to the network device only according to the contention-free PRACH resource associated with the target signal. For example, the terminal device sends the first request to the network device for the first time according to the contention-free PRACH resource associated with the target signal, and if the terminal device does not receive a response to the first request sent for the first time from the network device in a time window, the terminal device may send the first request to the network device for the second time according to the contention-free PRACH resource associated with the target signal until the number of times for which the terminal device sends the first request to the network device reaches a threshold.

Third manner: The terminal device may send the first request through the contention-based PRACH resource associated with the target signal at first, and when the terminal device satisfies a first transmission condition and does not receive a first response from the network device, the terminal device sends the first request through the contention-free PRACH resource corresponding to the target signal, the first response being a response to the first request sent through the contention-based PRACH resource. For example, the terminal device may continuously send the first request through the contention-based PRACH resource associated with the target signal, and if the terminal device still does not receive any response to the first request when the number of times for which the first request is sent reaches a threshold, the terminal device may send the first request through the contention-free PRACH resource associated with the target signal.

Fourth manner: The terminal device may send the first request through the contention-free PRACH resource associated with the target signal at first, and when the terminal device satisfies a second transmission condition and does not receive the first response from the network device, the terminal device sends the first request through the contention-based PRACH resource corresponding to the target signal, the first response being a response to the first request sent through the contention-free PRACH resource. For example, the terminal device may continuously send the first request through the contention-free PRACH resource associated with the target signal, and if the terminal device still does not receive any response to the first request when the number of times for which the first request is sent reaches a threshold, the terminal device may send the first request through the contention-based PRACH resource associated with the target signal.

In at least one alternative embodiment of the disclosure, satisfying at least one of the first transmission condition or the second transmission condition may refer to that the number of times for which the terminal device continuously sends the first request reaches a threshold. Here, the threshold for the first transmission condition and the threshold for the second transmission condition may be the same or different.

In at least one alternative embodiment of the disclosure, satisfying at least one of the first transmission condition or the second transmission condition may also refer to that a timer stops or a timer expires. Here, the timer duration for the first transmission condition and the timer duration for the second transmission condition may be the same or different.

In at least one alternative embodiment, when the target signal is associated with both the contention-based PRACH resource and the contention-free PRACH resource, before the terminal device sends the first request, the network device may further send first indication information to the terminal device. The first indication information is used to indicate that it is not allowed to use the contention-based PRACH resource to send the first request. In such case, after receiving the first indication information, the terminal device sends the first request by use of only the contention-free PRACH resource associated with the target signal.

In at least one alternative embodiment, when the target signal is associated with both the contention-based PRACH resource and the contention-free PRACH resource, before the terminal device sends the first request, the network device may further send second indication information to the terminal device. The second indication information is used to indicate that it is allowed to use the contention-based PRACH resource to send the first request. In such case, the terminal device, after receiving the second indication information, may send the first request to the network device through the above four solutions.

In at least one alternative embodiment, the second signal set may include part of CSI-RSs. In such case, the network device may configure only associated contention-based PRACH resources for the part of the CSI-RSs, and if the target signal belongs to the part of the CSI-RSs, the terminal device may send the first request by use of the contention-based PRACH resource associated with the target CSI-RS.

Or, the network device may also configure only associated contention-free PRACH resources for the part of the CSI-RSs, and if the target signal belongs to the part of the CSI-RSs, the terminal device may send the first request by use of the contention-free PRACH resource associated with the target CSI-RS.

Or, the network device may not only configure the associated contention-based PRACH resources for the part of the CSI-RSs but also configure the associated contention-free PRACH resources for the part of the CSI-RSs, and if the target signal belongs to the part of the CSI-RSs, the terminal device may send the first request by use of at least one of the contention-based PRACH resource associated with the target CSI-RS or the contention-free PRACH resource associated with the target CSI-RS and may specifically send the first request to the network device through the above four solutions.

In at least one alternative embodiment, the second signal set may include part of SS/PBCH blocks. In such case, the network device may configure only associated contention-based PRACH resources for the part of the SS/PBCK blocks, or the network device does not configure any associated contention-based PRACH resource for the part of the SS/PBCH blocks but the terminal device acquires associations between the part of the SS/PBCH blocks and the contention-based PRACH resources from a system message or a network message, and if the target signal belongs to the part of the SS/PBCH blocks, the terminal device may send the first request by use of the contention-based PRACH resource associated with the target SS/PBCH block.

Or, the network device may configure only associated contention-free PRACH resources for the part of the SS/PBCH blocks, and if the target signal belongs to the part of the SS/PBCH blocks, the terminal device may send the first request by use of the contention-free PRACH resource associated with the target SS/PBCH block.

Or, the network device may configure associated contention-based PRACH resources for the part of the SS/PBCH blocks or the terminal device acquires the associations between the part of the SS/PBCH blocks and the contention-based PRACH resources from the system message or a broadcast message, the network device also configures associated contention-free PRACH resources for the part of the SS/PBCH blocks, and if the target signal belongs to the part of the SS/PBCH blocks, the terminal device may send the first request by use of at least one of the contention-based PRACH resource associated with the target SS/PBCH block or the contention-free PRACH resource associated with the target SS/PBCH block and may specifically send the first request to the network device through the above four solutions.

In at least one alternative embodiment, if the target signal is an SS/PBCH block, the terminal device may acquire an association between the SS/PBCH block and a contention-based PRACH resource from a system message or a broadcast message, and when the network device also configures an association between the SS/PBCH block and a contention-free PRACH resource for the SS/PBCH block, the terminal device may send the first request by use of the contention-free PRACH resource corresponding to the SS/PBCH block. In other words, even if the terminal device has obtained the association between the SS/PBCH block and the contention-based PRACH resource, the terminal device also needs the network device to configure the association between the SS/PBCH block and the contention-free PRACH resource. The terminal device does not use the association, acquired from the system message or the broadcast message, between the SS/PBCH block and the contention-based PRACH resource, but uses the association, configured by the network device, between the SS/PBCH block and the contention-free PRACH resource.

In at least one alternative embodiment, after determining the PRACH resource corresponding to the target signal, the terminal device may start a timer. If the terminal device does not receive a response to the first request within the duration of the timer or when the timer expires, the terminal device may stop transmission of the first request to the network device. Or, if the terminal device receives the response to the first request within the duration of the timer, namely before the timer expires, the terminal device may also stop transmission of the first request to the network device. Or, the terminal device may stop transmission of the first request to the network device when the number of times for which the terminal device sends the first request to the network device reaches a threshold.

It is to be understood that being more than or equal to in the embodiment of the disclosure refers to that a value range of a certain comparison object may be larger than, or equal to or more than or equal to. For example, the first request is stopped to be sent if the number of times for which the first request is sent reaches a certain value, or the quality of the signal is compared with a threshold and the target signal in the second signal set is determined if the quality of the signal in the first signal set is more than or equal to a certain value.

It is to be understood that interaction between the network device and the terminal device and related properties, functions and the like described from the network device correspond to related properties and functions of the terminal device. Moreover, the related contents have been described in detail in the method 100 and, for simplicity, will not be elaborated herein.

It is also to be understood that, in various embodiments of the disclosure, a magnitude of a sequence number of each process does not mean an execution sequence and the execution sequence of each process should be determined by its function and an internal logic and should not constitute any limit to an implementation process of the embodiments of the disclosure.

The method for link configuration according to the embodiments of the disclosure is described above in detail and a device for link reconfiguration according to the embodiments of the disclosure will be described below in combination with FIG. 3 and FIG. 4. The technical characteristics described in the method embodiment are applied to the following device embodiment.

Figure 3:
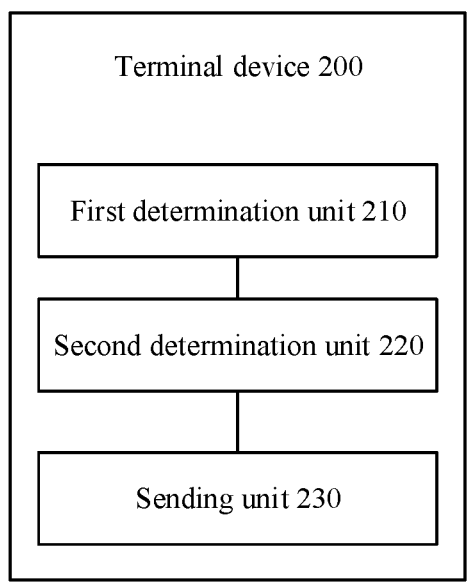
FIG. 3 is a schematic block diagram of a terminal device according to an embodiment of the disclosure.

FIG. 3 is a schematic block diagram of a terminal device 200 according to an embodiment of the disclosure. As illustrated in FIG. 3, the terminal device 200 includes a first determination unit 210, a second determination unit 220 and a sending unit 230.

The first determination unit 210 is configured to, when quality of a signal in a first signal set is bad enough to satisfy a first condition, select a target signal from a second signal set, quality of the target signal being good enough to satisfy a second condition.

The second determination unit 220 is configured to determine a PRACH sequence and/or resource corresponding to the target signal according to associations between signals in the second signal set and PRACH sequences and/or resources.

The sending unit 230 is configured to send a first request to a network device through the PRACH sequence and/or resource corresponding to the target signal, the first request being used to notify the network device of information about the target signal selected by the terminal device.

Therefore, the terminal device of the embodiment of the disclosure is favorable for improving signal transmission performance.

In at least one alternative embodiment of the disclosure, the target signal is only associated with a contention-based PRACH resource, and the sending unit is specifically configured to send the first request through the contention-based PRACH resource corresponding to the target signal.

In at least one alternative embodiment of the disclosure, the target signal is only associated with a contention-free PRACH resource, and the sending unit is specifically configured to send the first request through the contention-free PRACH resource corresponding to the target signal.

In at least one alternative embodiment of the disclosure, the target signal is associated with both the contention-based PRACH resource and the contention-free PRACH resource, and the sending unit is specifically configured to send the first request through at least one of the contention-based PRACH resource corresponding to the target signal or the contention-free PRACH resource corresponding to the target signal.

In at least one alternative embodiment of the disclosure, the sending unit is specifically configured to send the first request through the contention-based PRACH resource corresponding to the target signal and, when a first transmission condition is met and a first response sent by the network device is not received, send the first request through the contention-free PRACH resource corresponding to the target signal, the first response being a response to the first request sent through the contention-based PRACH resource.

In at least one alternative embodiment of the disclosure, the sending unit is specifically configured to send the first request through the contention-free PRACH resource corresponding to the target signal and, when a second transmission condition is met and the first response sent by the network device is not received, send the first request through the contention-based PRACH resource corresponding to the target signal, the first response being a response to the first request sent through the contention-free PRACH resource.

In at least one alternative embodiment of the disclosure, the terminal device further includes: a first receiving unit, configured to, before the sending unit sends the first request, receive first indication information from the network device, the first indication information being used to indicate that it is not allowed to use the contention-based PRACH resource to send the first request.

The sending unit is specifically configured to send the first request by use of the contention-free PRACH resource corresponding to the target signal only.

In at least one alternative embodiment of the disclosure, the target signal is an SS/PBCH block, and the terminal device further includes: an acquisition unit, configured to acquire an association between the SS/PBCH block and a contention-based PRACH resource from a system message or a broadcast message.

The sending unit is specifically configured to send the first request through the contention-free PRACH resource corresponding to the SS/PBCH block.

In at least one alternative embodiment of the disclosure, the terminal device further includes: a second receiving unit, configured to, before the sending unit sends the first request, receiving second indication information from the network device, the second indication information being used to indicate that the first request is allowed to be sent by use of the contention-based PRACH resource.

In at least one alternative embodiment of the disclosure, the second signal set includes at least one of: one or more CSI-RSs; or, one or more SS/PBCH blocks.

In at least one alternative embodiment of the disclosure, the second signal set includes the CSI-RSs, and the terminal device further includes: a third receiving unit, configured to receive first configuration information from the network device. Herein, the first configuration information is used to indicate at least one of: associations between at least part of the CSI-RSs in the second signal set and contention-based PRACH resources; or, associations between the at least part of the CSI-RSs in the second signal set and contention-free PRACH resources.

In at least one alternative embodiment of the disclosure, the second signal set includes the SS/PBCH blocks, and the terminal device further includes: a fourth receiving unit, configured to receive second configuration information from the network device. The second configuration information is used to indicate at least one of: associations between at least part of the SS/PBCH blocks in the second signal set and contention-free PRACH resources; or, associations between the at least part of the SS/PBCH blocks in the second signal set and contention-based PRACH resources.

In at least one alternative embodiment of the disclosure, the terminal device further includes: a second acquisition unit, configured to acquire associations between the at least part of the SS/PBCH blocks in the second signal set and the contention-based PRACH resources from the system message or the broadcast message.

In at least one alternative embodiment of the disclosure, the terminal device further includes: a first processing unit, configured to, when a first timer expires and no response to the first request is received from the network device, stop transmission of the first request to the network device.

In at least one alternative embodiment of the disclosure, the terminal device further includes: a second processing unit, configured to, before the first timer expires and when the response to the first request is received from the network device, stop transmission of the first request to the network device.

In at least one alternative embodiment of the disclosure, the terminal device further includes: a third processing unit, configured to, when a number of times for which the first request is sent to the network device is greater than or equal to a first threshold, stop transmission of the first request to the network device.

It is to be understood that the terminal device 200 according to the embodiment of the disclosure may correspond to the terminal device in the method embodiment of the disclosure and the abovementioned and other operations and/or functions of each unit in the terminal device 200 are adopted to implement the corresponding flows executed by the terminal device in the method in FIG. 2 respectively and will not be elaborated herein for simplicity.

Figure 4:
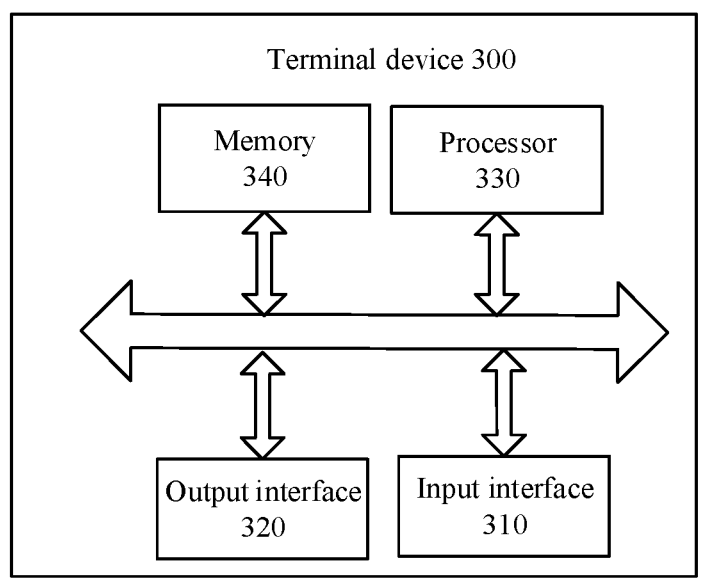
FIG. 4 is another schematic block diagram of a terminal device according to an embodiment of the disclosure.

As illustrated in FIG. 4, an embodiment of the disclosure also provides a terminal device 300. The terminal device 300 may be the terminal device 200 in FIG. 3, and may be configured to execute functions of the terminal device corresponding to the method 100 in FIG. 2. The terminal device 300 includes an input interface 310, an output interface 320, a processor 330 and a memory 340. The input interface 310, the output interface 320, the processor 330 and the memory 340 may be connected through a bus system. The memory 340 is configured to store a program, instructions or codes. The processor 330 is configured to execute the program, instructions or codes in the memory 340 to control the input interface 310 to receive a signal, control the output interface 320 to send a signal and complete operations in the method embodiment.

Therefore, the terminal device of the embodiment of the disclosure is favorable for improving signal transmission performance.

It is to be understood that, in the embodiment of the disclosure, the processor 330 may be a central processing unit (CPU), and the processor 330 may also be another universal processor, a digital signal processor (DSP), an application specific integrated circuit (ASIC), a field programmable gate array (FPGA) or another programmable logic device, discrete gate or transistor logic device and discrete hardware component and the like. The universal processor may be a microprocessor or the processor may also be any conventional processor and the like.

The memory 340 may include a read-only memory (ROM) and a random access memory (RAM) and provides instructions and data for the processor 330. A part of the memory 340 may further include a nonvolatile RAM. For example, the memory 340 may further store information of a device type.

In an implementation process, each operation of the method may be completed by an integrated logic circuit of hardware in the processor 330 or instructions in a software form. The contents of the method disclosed in combination with the embodiments of the disclosure may be directly embodied to be executed and completed by a hardware processor or executed and completed by a combination of hardware and software modules in the processor. The software module may be located in a mature storage medium in this field such as a RAM, a flash memory, a ROM, a programmable ROM or electrically erasable programmable ROM and a register. The storage medium is located in the memory 340. The processor 330 reads information from the memory 340 and completes the contents of the method in combination with hardware. No more detailed descriptions will be made herein to avoid repetitions.

In a specific implementation, the determination units, acquisition units and processing units in the terminal device 200 may be implemented by the processor 330 in FIG. 4, and the receiving units in the terminal device 200 may be implemented by the input interface 310 in FIG. 4. The sending unit of the terminal device 200 may be implemented by the output interface 320 in FIG. 4.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of each embodiment of the disclosure. The storage medium includes: various media capable of storing program codes such as a U disk, a mobile hard disk, a ROM, a RAM, a magnetic disk or an optical disk.

The above is only the specific implementation of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for link reconfiguration, comprising:
selecting, by a terminal device, a target signal from a second signal set when a beam failure occurs, wherein the beam failure comprises that quality of a signal in a first signal set satisfies a first condition, the first condition comprises that the quality of the signal is worse than a threshold, and quality of the target signal is good enough to satisfy a second condition;
determining, by the terminal device, a physical random access channel (PRACH) sequence and resource corresponding to the target signal according to associations between signals in the second signal set and PRACH sequences and resources; and
sending, by the terminal device, a first request to a network device through the PRACH sequence and resource corresponding to the target signal, wherein the first request is used to notify the network device of information about the target signal selected by the terminal device,
wherein sending, by the terminal device, the first request to the network device through the PRACH sequence and resource corresponding to the target signal comprises:
when the target signal is only associated with a contention-based PRACH resource in contention-based PRACH resource and contention-free PRACH resource, sending, by the terminal device, the first request through the contention-based PRACH resource.

2. The method of claim 1, wherein the target signal is a synchronization signal (SS)/physical broadcast channel (PBCH) block, and
the method further comprises: acquiring, by the terminal device, an association between the SS/PBCH block and the contention-based PRACH resource from a system message; and
wherein sending, by the terminal device, the first request through the contention-free PRACH resource corresponding to the target signal comprises:
sending, by the terminal device, the first request through a contention-free PRACH resource corresponding to the SS/PBCH block.

3. The method of claim 1, wherein the second signal set comprises at least one of:
one or more channel state information-reference signals (CSI-RS s); or,
one or more SS/PBCH blocks.

4. The method of claim 3, wherein the second signal set comprises the CSI-RS s, and
the method further comprises: receiving, by the terminal device, first configuration information from the network device,
wherein the first configuration information is used to indicate:
associations between the at least part of the CSI-RS s in the second signal set and contention-free PRACH resources.

5. The method of claim 3, wherein the second signal set comprises the SS/PBCH blocks, and
the method further comprises: receiving, by the terminal device, second configuration information from the network device,
wherein the second configuration information is used to indicate:

associations between at least part of the SS/PBCH blocks in the second signal set and contention-free PRACH resources.

6. The method of claim 3, further comprising:
acquiring, by the terminal device, associations between at least part of the SS/PBCH blocks in the second signal set and contention-based PRACH resources from a system message.

7. The method of claim 1, further comprising:
before a first timer expires and when the terminal device receives a response to the first request from the network device, stopping, by the terminal device, transmission of the first request to the network device.

8. The method of claim 1, further comprising:
when a number of times for which the terminal device sends the first request to the network device is greater than or equal to a first threshold, stopping, by the terminal device, transmission of the first request to the network device.

9. A terminal device, comprising:
a processor;
a memory storing instructions executable by the processor;
an input interface; and
an output interface,
wherein the memory, the processor, the input interface and the output interface are connected through a bus system, and
the processor is configured to:
select a target signal from a second signal set when a beam failure occurs, wherein the beam failure comprises that quality of a signal in a first signal set satisfies a first condition, the first condition comprises that the quality of the signal is worse than a threshold, and quality of the target signal is good enough to satisfy a second condition;
determine a physical random access channel (PRACH) sequence and resource corresponding to the target signal according to associations between signals in the second signal set and PRACH sequences and resources; and
wherein the output interface is configured to send a first request to a network device through the PRACH sequence and resource corresponding to the target signal, wherein the first request is used to notify the network device of information about the target signal selected by the terminal device,
when the target signal is only associated with a contention-based PRACH resource in contention-based PRACH resource and contention-free PRACH resource, the output interface is configured to send the first request through the contention-based PRACH resource.

10. The terminal device of claim 9, wherein the target signal is a synchronization signal (SS)/physical broadcast channel (PBCH) block, and
the processor is further configured to acquire an association between the SS/PBCH block and the contention-based PRACH resource from a system message; and
wherein the output interface is specifically configured to:
send the first request through a contention-free PRACH resource corresponding to the SS/PBCH block.

11. The terminal device of claim 9, wherein the second signal set comprises at least one of:
one or more channel state information-reference signals (CSI-RS s); or,
one or more SS/PBCH blocks.

12. The terminal device of claim 11, wherein the second signal set comprises the CSI-RS s, and
the input interface is configured to receive first configuration information from the network device,
wherein the first configuration information is used to indicate:
associations between the at least part of the CSI-RS s in the second signal set and contention-free PRACH resources.

13. The terminal device of claim 11, wherein the second signal set comprises the SS/PBCH blocks, and
the input interface is further configured to receive second configuration information from the network device,
wherein the second configuration information is used to indicate:
associations between at least part of the SS/PBCH blocks in the second signal set and contention-free PRACH resources.

14. The terminal device of claim 11, wherein the processor is further configured to:
acquire associations between at least part of the SS/PBCH blocks in the second signal set and contention-based PRACH resources from a system message.

15. The terminal device of claim 9, wherein the processor is further configured to:
before a first timer expires and when a response to the first request is received from the network device, stop, through the output interface, transmission of the first request to the network device.

16. The terminal device of claim 9, wherein the processor is further configured to:
when a number of times for which the terminal device sends the first request to the network device is greater than or equal to a first threshold, stop, through the output interface, transmission of the first request to the network device.

17. A terminal device, comprising:
a processor;
a memory storing instructions executable by the processor;
an input interface; and
an output interface,
wherein the memory, the processor, the input interface and the output interface are connected through a bus system, and
the processor is configured to:
select a target signal from a second signal set when a beam failure occurs, wherein the beam failure comprises that quality of a signal in a first signal set satisfies a first condition, the first condition comprises that the quality of the signal is worse than a threshold, and quality of the target signal is good enough to satisfy a second condition;
determine a physical random access channel (PRACH) sequence and resource corresponding to the target signal according to associations between signals in the second signal set and PRACH sequences and resources; and
wherein the output interface is configured to send a first request to a network device through the PRACH sequence and resource corresponding to the target signal, wherein the first request is used to notify the network device of information about the target signal selected by the terminal device, and
wherein when the target signal is associated with both a contention-based PRACH resource and a contention-free PRACH resource, the output interface is configured to send the first request through the contention-free PRACH resource corresponding to the target signal.

18. The terminal device of claim 17, wherein the output interface is specifically configured to:
send the first request to the network device for the first time according to the contention-free PRACH resource; and
when the terminal device does not receive a response to the first request sent for the first time from the network device in a time window, send the first request to the network device for the second time according to the contention-free PRACH resource until the number of times for which the terminal device sends the first request to the network device reaches a threshold.

* * * * *